United States Patent Office 3,213,039
Patented Oct. 19, 1965

3,213,039
SILICA-ALUMINA SUPPORTED NICKEL HYDROGENATION CATALYST AND METHOD OF MANUFACTURE THEREOF
Herbert J. Brice, Jr., Ashland, Ky., assignor to Ashland Oil & Refining Company, Ashland, Ky., a corporation of Kentucky
No Drawing. Filed Feb. 20, 1962, Ser. No. 174,409
6 Claims. (Cl. 252—455)

This invention relates to the production of tetrahydronaphthalene by the partial hydrogenation of naphthalene over a specialized catalyst.

Tetrahydronaphthalene, commonly known in the trade as tetralin, has the formula $C_{10}H_{12}$, corresponding to the structure:

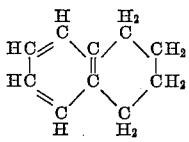

It is well known that tetralin can be produced by partially hydrogenating naphthalene. The reaction is reversible and proceeds in accordance with the equation:

$$C_{10}H_8 + 2H_2 \rightleftharpoons C_{10}H_{12}$$

two molecules of hydrogen reacting with a molecule of naphthalene to saturate one of the two rings of the naphthalene molecule.

In general, the production of tetralin by the partial hydrogenation of naphthalene is accompanied by a second reaction in which decahydronaphthalene, commonly known in the trade as Decalin, is formed. This reaction, which is also reversible, occurs as further hydrogenation of previously produced tetralin which is present in the reaction zone:

$$C_{10}H_{12} + 3H_2 \rightleftharpoons C_{10}H_{18}$$

In past processes for the production of tetralin, large quantities of Decalin have inevitably been produced as a concomitant to the production of tetralin. By controlling reaction operating conditions it has been possible to produce larger proportions of tetralin than Decalin, for example, tetralin to Decalin yields ratios of about 4 or 5 to 1, but a substantial quantity of Decalin has inevitably accompanied the production of tetralin.

The reason for the simultaneous production of both tetralin and Decalin in past processes for the hydrogenation of naphthalene is explained by considering the reversible interrelation of the two reactions involved. It has not been possible with previously known catalysts to improve the kinetics of the naphthalene to tetralin reaction without a simultaneous and generally comparable improvement in the kinetics of the tetralin to Decalin reaction. Consequently it has not heretofore been possible to produce a hydrogenated product free of Decalin.

I have discovered a novel hydrogenation catalyst which is effective to hydrogenate naphthalene to produce tetralin in excellent yields, but which at the same time is selective in its operation in that it does not substantially further hydrogenate the tetralin which is produced to form Decalin therefrom. By using this catalyst in a naphthalene hydrogenation process it is possible to produce large yields of tetralin without the accompanying production of significant quantities of Decalin.

Briefly, the catalyst I have found to be effective for the selective hydrogenation of naphthalene to tetralin is produced by impregnating a silica-alumina cracking catalyst with a solution of nickel octoate

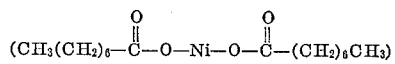

heating the resultant impregnated slurry to remove solvents therefrom, igniting the dry mixture to decompose the nickel octoate, and calcining the catalyst at an elevated temperature.

The catalyst so produced is utilized to hydrogenate naphthalene at temperatures in the range of about 400 to 650° F., pressures from about atmospheric to 700 p.s.i., space velocities in the range of about 0.1 to 10, and hydrogen to hydrocarbon mole ratios in the range of about 3/1 to about 20/1. Excellent yields of tetralin are produced, as high or even higher than 99.0%, together with the production of extremely small yields of both cis- and trans-Decalin. Moreover, this catalyst can also be used to partially hydrogenate alkyl naphthalenes to produce the corresponding alkyl tetralins, with little or no formation of alkyl Decalins.

Following is a detailed example of one method of preparing the specialized catalyst I have discovered for the selective conversion of naphthalene to tetralin:

Example 1.—A silica-alumina cracking catalyst was crushed, and the material passing a 30 mesh screen and retained on a 60 mesh screen was recovered for the new catalyst base. As a non-limiting example of one commercially available silica-alumina cracking catalyst which can be used as the starting material for the production of the catalyst of this invention, the catalyst which is produced by Filtro Corporation and sold as a TCC cracking catalyst is suitable. It will be understood however that other silica and/or alumina catalyst base materials can be used. Next, 110 grams of nickel octoate were dissolved in 100 cc. of benzene. Nickel octoate is available commercially, one suitable product being supplied by Ferro Chemicals.) One hundred grams of the crushed silica-alumina catalyst base were added to the nickel octoate-benzene solution and a slurry made. The slurry was heated until the benzene had completely evaporated from it, and heating was continued until the dry mixture ignited. When the burning had ceased, the material was placed in a muffle furnace at a temperature of about 1000° F. for approximately one hour to complete the calcination of the catalyst.

Nickel octoate is a solid at room temperature, and is preferably dissolved in benzene or another suitable solvent so that it can be impregnated or deposited on the catalyst base. The solvent has no chemical function. The heating step removes the solvent from the octoate, thereby leaving the solid octoate on the catalyst base. Upon ignition, the octoate decomposes and leaves finely divided element nickel and/or oxides on the support.

While nickel-based hydrogenation catalysts have long been known, so far as I know none of these catalysts is effective to hydrogenate naphthalene selectively to tetralin but not Decalin. Apparently, the compound from which the nickel is impregnated onto the support greatly affects the catalytic effect of the resultant material.

This catalyst may be used in conventional hydrogenation equipment at the operating conditions previously specified. Following are specific examples of the hydrogenation of naphthalene to tetralin over the present catalyst.

Table I

| Test Number | T-1 | T-2 |
|---|---|---|
| Feed | Petroleum naphthalene, 80.0° F. P. | |
| Hydrogen | Reformer Hydrogen | |
| Conditions: | | |
| Temperature, F | 442 | 471 |
| Pressure, p.s.i.g | 200 | 200 |
| WHSV | 1.2 | 1.2 |
| $H_2$/HC Mole Ratio | 7.3 | 7.3 |
| Liquid Product Composition, Wt. percent: | | |
| Trans-Decalin | 0.2 | 0.3 |
| Cis-Decalin | 0.2 | 0.4 |
| Tetralin | 92.9 | 99.1 |
| Naphthalene | 6.7 | 0.2 |
| Phase of Reactant Naphthalene | Liquid | Liquid |

From the foregoing table, it will be seen that at a temperature of about 470° and a pressure of 200 p.s.i.g., the yield of tetralin was extremely high, 99.1%, with a total Decalin production of only 0.7%. At slightly lower temperatures, around 440° F., the conversion of naphthalene to tetralin was not quite so high (92.9%), but none the less the total yield of Decalins was even smaller, only 0.4%. Thus, depending upon operating conditions employed, the present catalyst may be used to produce extremely high conversions to naphthalene to tetraling with low yields of Decalins or may be used at slightly lower temperatures to effect slightly lower conversions of naphthalene to tetralin but with correspondingly lower production of Decalins.

In the examples given in Table I, the feed stock used was a petroleum naphthalene of 80.0° F. freeze point. The catalyst I have discovered is also effective to hydrogenate coal tar naphthalene to preferentially produce tetralin therefrom. In the conversion of coal tar naphthalene to tetralin, yields are not generally quite as good as those obtained in the hydrogenation of petroleum naphthalene, but none the less tetralin is produced in large excess in relation to the minor quantities of Decalin which are produced.

As previously mentioned, this catalyst may also be used to effect partial hydrogenation of alkyl naphthalenes for example, methylnaphthalene, ethylnaphthalene, and homologs thereof to the corresponding alkyl tetralins. Table II illustrates two typical such conversions:

Table II

| Test Number | Methylnaphthalene charge | T-3 | T-4 |
|---|---|---|---|
| Hydrogen | | Reformer Hydrogen | |
| Conditions: | | | |
| Temperature, F | | 580 | 580 |
| Pressure, p.s.i.g | | 600 | 600 |
| WHSV | | 2-3 | 2.0 |
| $H_2$/HC Ratio | | 6/1 | 6/1 |
| Liquid Product Composition, Weight percent: | | | |
| Decalins | | 6.6 | 3.5 |
| Mixed methyl tetralins | | 93.4 | 92.7 |
| Naphthalene | 1.3 | | |
| Beta-methylnaphthalene | 66.3 | | 2.4 |
| Alpha-methylnaphthalene | 28.6 | | 1.4 |
| >Methylnaphthalene | 3.8 | | |

While the data of Table II is specific to the conversion of methylnaphthalenes to mixed methyl tetralins, conversions of other alkyl naphthalenes may be similarly effected.

Having described my invention, what is claimed is:

1. A method of manufacturing an improved catalyst for the selective hydrogenation of naphthalene to tetralin without the production of Decalin in substantial quantities, said method comprising, dissolving nickel octoate in a volatilizable hydrocarbon solvent therefor, impregnating a silica-alumina catalyst base with the solution of nickel octoate, evaporating said solvent from said base, igniting the nickel octoate impregnated on said base, and calcining the resultant material at an elevated temperature.

2. A method of manufacturing an improved catalyst for the selective hydrogenation of naphthalene to tetralin without the production of Decalin in substantial quantities, said method comprising, dissolving nickel octoate in a volatilizable aromatic hydrocarbon solvent therefor, impregnating a crushed silica-alumina catalyst base with the solution of nickel octoate, evaporating said solvent from said base, thermally decomposing the nickel octoate impregnated on said base by igniting said octoate, and calcining the resultant material at about 1000° F.

3. A method of manufacturing an improved catalyst for the selective hydrogenation of naphthalene to tetralin without the production of Decalin in substantial quantities, said method comprising, dissolving nickel octoate in benzene, impregnating a silica alumina catalyst base with the solution of nickel octoate, the weight ratio of the octoate to the base being about 11/10, heating the resultant slurry to evaporate said benzene therefrom, igniting the nickel octoate impregnated in said base to decompose the same, and calcining the resultant material at an elevated temperature.

4. The method of claim 3 wherein said calcining is effected at a temperature of about 1000° F. for a period of about one hour.

5. The method of claim 3 wherein the solution of said octoate in said benzene contains 11 parts octoate to each 10 parts benzene therein.

6. An improved catalyst for the selective hydrogenation of naphthalene to tetralin prepared by a process comprising: dissolving nickel octoate in a volatilizable hydrocarbon solvent therefor; impregnating a silica-alumina catalyst base with the solution of nickel octoate; evaporating said solvent from said base; igniting the nickel octoate impregnated on said base; and calcining the resultant material at an elevated temperature.

References Cited by the Examiner

UNITED STATES PATENTS

| | | | |
|---|---|---|---|
| 1,139,592 | 5/15 | Spieler | 252—459 |
| 2,481,921 | 9/49 | Gwynn | 260—667 |
| 2,537,968 | 1/51 | Cerveny | 260—667 |
| 2,766,306 | 10/56 | Heinemann et al. | 260—667 |
| 2,949,429 | 8/60 | Bailey et al. | 252—459 |
| 3,030,430 | 4/62 | Dunlop et al. | 260—667 |

MAURICE A. BRINDISI, *Primary Examiner.*

ALPHONSO D. SULLIVAN, *Examiner.*